United States Patent Office 2,798,163
Patented July 2, 1957

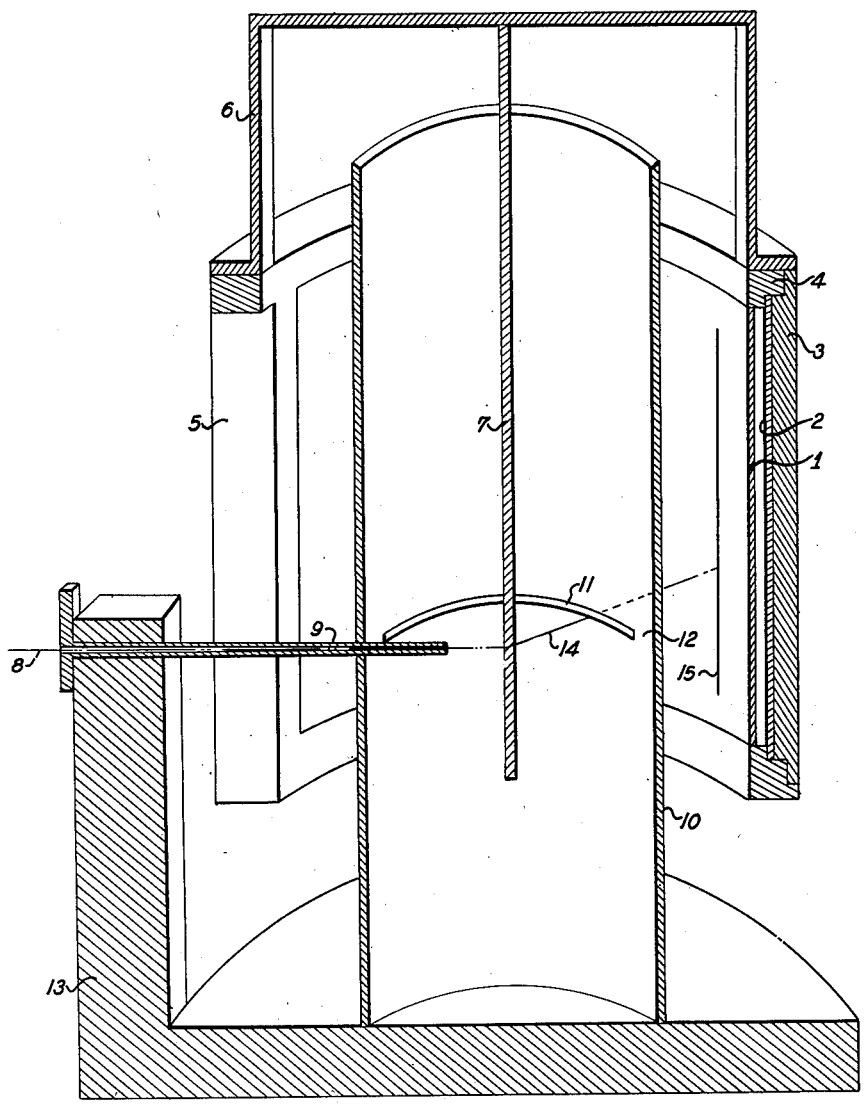

2,798,163

METHOD OF X-RAY CONTINUOUS ANALYSIS AND AN APPARATUS THEREFOR

Shigeru Nishigaki, Osaka-fu, Japan

Application July 27, 1954, Serial No. 445,952

2 Claims. (Cl. 250—53)

The present invention relates to a method of X-ray continuous analysis and an apparatus therefor, particularly to a method of and an apparatus for X-ray continuous analysis of specimens being moved in a rectilinear path.

Heretofore, in order to analyse by X-ray partially-varied structure along the length of specimen, poly-crystalline specimen, it has been necessary to take a photograph separately at each portion of the specimen along the whole length thereof. Accordingly, it has been extremely difficult to coincide the photographing conditions for the many pictures with each other and further to pick a portion out of a picture shown as a curve which portion is proper to study the specimen comparing with a portion selected out of another picture representing another portion of the specimen.

Further, like disadvantages have been encountered inevitably when differences in structure among several kinds of powder arranged on the straight line is analysed or when a structural change in relation to a difference in temperature is analysed by means of subjecting a linear specimen to a continuous difference in temperature by a source of heat such as an electric heater.

It is an object of the present invention to provide a novel improved method of analysing by X-rays partially-varied crystals of a rectilinear, poly-crystalline specimen and an apparatus therefor.

It is a specified object of the present invention to provide a novel improved method of taking a single sheet of photograph by X-rays whereby a continuous linear picture illustrating a change in partial structures of a rectilinear specimen is photographed under a uniform condition.

Accordingly, it is another object of the present invention to facilitate the accurate method of X-ray analysis which seems to have been impossible in the strict sense.

For a better understanding of this invention and to show how it may be carried into effect, reference will now be made, by way of example, to the accompanying drawing which shows a fragmentarily sectional diagrammatical sketch of a preferred embodiment of this invention.

Referring to the drawing, a cylindrical film cassette 4 is provided at the inner side thereof with a coaxial screen 1 which is selectively transparent to X-rays but not to light. The film cassette 4 is also provided with a sheet of sensitive film 2 and, at the outer side, a cover 3. A vertically long opening 5 is pierced in a vertical edge portion of the film cassette 4 so as to locate a first slit assembly 9 freely through the opening 5. A holder 6 for a specimen 7 is secured over the film cassette 4. The film cassette 4 is so provided as to be lifted and lowered together with the holder 6 in relation to the body member 13 of the apparatus by such a means as a cam (not shown). Fixed on the body member 13 of the apparatus is the said first slit assembly 9 which directs a beam of X-rays against the specimen 7 at the right angles. A shielding cylinder 10 is also fixed vertically on the body member 13 and extended between the specimen 7 and the film cassette 4. The shielding cylinder 10 is pierced by horizontally arcuate second slits 11 in the same level with the passage of the beam of X-rays from the first slit assembly 9. Narrow connecting portions 12 are provided between the said second slits 11 in the shielding cylinder 10 to prevent the upper portion thereof from separating.

In operation of analysing partially-varied crystals of a polycrystalline specimen, the rectilinearly-shaped specimen 7 is mounted depending vertically from the holder 6 which is capable of either ascending or descending together with the film cassette 4 at any desired speed. When a beam 8 of X-rays passes through the first slit assembly 9, the beam 8 irradiates a very small portion, for example, the lowermost portion of the specimen 7 whence diffracated X-rays 14 travel along a path in a conical surface. According to the present invention, a portion of the diffracted X-rays 14 which is allowed to pass through the second slit 11 and is duly arranged in a plane falls upon the sensitive film 2 and projects a spot thereon.

After a moment, the X-ray beam 8 irradiated the next upper portion of the specimen 7 which has descended slightly together with the film cassette 4, at the said next upper portion of the specimen 7 the beam being diffracted in like manner. The spot thus projected at the next upper location on the sensitive film 2 represents the structure of the next upper portion of the specimen 7.

By means of a subsequent continuation of such operation as above, a linear picture 15 consisting of a continuation of such spots as above is photographed. Any change consisting in the line 15 indicates a corresponding change in the partially-varied crystals of the specimen 7 so as to permit any one to analyse the change in structure of the poly-crystalline specimen continuously and easily.

In operation of studying several kinds of powder arranged individually on separate parts of a rectilinear base of a specimen, a linear picture on the film corresponds to the arrangement of the powder. Therefore, under a uniform condition, a number of examples may be analysed.

When a uniform specimen of the rectilinear shape is subjected to a heat treatment by means of a heating source such as an electric heater, the portions of the specimen heated up to different temperatures and moved according to this invention show continuously the change of structure depending upon the change in temperature under a uniform condition other than the temperature.

Many modifications in the mechanism of the apparatus, the manner of the operation, and application thereof, within the scope of the invention described above will be apparent to those skilled in the art without a departure from the inventive concept.

I claim:

1. An apparatus for linearly moving X-ray continuous analysis, which comprises a cylindrical film cassette, a means of hanging a rectilinear specimen coaxially with said cassette, a means of lifting and lowering said film cassette together with a specimen, a shielding cylinder provided with a slit therein and located between said film cassette and the specimen, and a slit assembly through which X-rays are directed on to the specimen, said shielding cylinder and said slit assembly being secured on a body member of the apparatus.

2. A method of analysing linearly moving specimens by the apparatus for X-ray continuous analysis of the kind described comprising forming the specimen in a rectilinear shape, hanging the specimen from a holding means, arranging around the specimen a cylindrical film cassette directing an X-ray beam to the specimen through a first slit fixed in relation to the apparatus, moving said specimen, the holding means therefor, and the film cassette together with each other continuously and vertically in relation to the path of said beam, inserting a slit formed in a shielding cylinder across a path of X-rays diffracted at the specimen, whereby a photograph comprising a rectilinear picture corresponding to the rectilinear specimen is taken on a sensitive film in said film cassette.

References Cited in the file of this patent

UNITED STATES PATENTS

| | | |
|---|---|---|
| 2,347,638 | McLachlan | Apr. 25, 1944 |
| 2,396,069 | Zapp | Mar. 5, 1946 |
| 2,543,825 | Beu et al. | Mar. 6, 1951 |
| 2,584,962 | Gross | Feb. 5, 1952 |
| 2,589,931 | Dvorak | Mar. 18, 1952 |